(No Model.)
J. S. JOHNSON.
COMPENSATING CLUTCH FOR CORN PLANTERS.
No. 376,308. Patented Jan. 10, 1888.
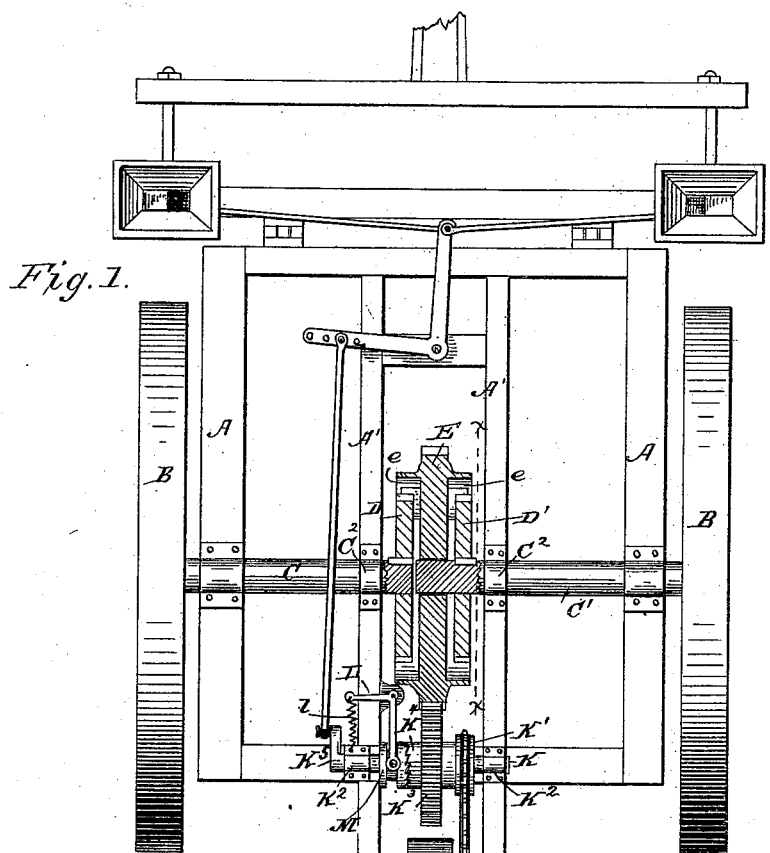
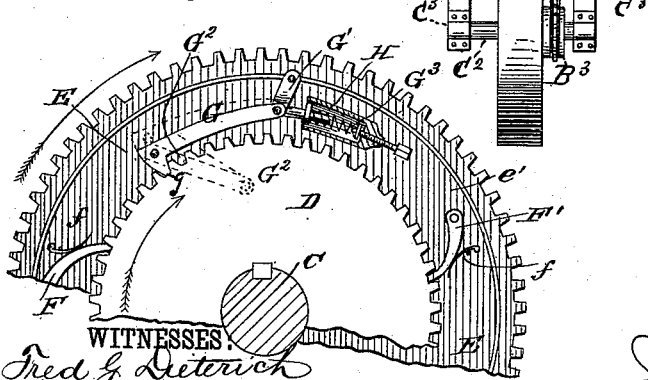
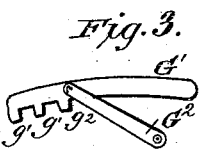
WITNESSES:
Fred G. Dieterich
Solon C. Kemon
INVENTOR:
Jno. S. Johnson
BY Munn & Co.
ATTORNEYS.

UNITED STATES PATENT OFFICE.

JOHN SWENOM JOHNSON, OF WAUKON, IOWA.

COMPENSATING CLUTCH FOR CORN-PLANTERS.

SPECIFICATION forming part of Letters Patent No. 376,308, dated January 10, 1888.

Application filed July 7, 1887. Serial No. 243,691. (No model.)

*To all whom it may concern:*

Be it known that I, JOHN SWENOM JOHNSON, of Waukon, in the county of Allamakee and State of Iowa, have invented a new and useful Improvement in Compensating Clutches for Corn-Planters, of which the following is a specification.

My invention is especially adapted for corn-planters which employ a dropping mechanism actuated by the wheels; but some portions of the device may be employed in connection with gearing having a varying or differential motion, which is employed to operate devices from the gear having the slowest motion.

The object of the main part of my invention is to provide improved mechanism for actuating the seed-droppers of a corn-planter at regular intervals as the machine moves forward to check-row with the adjoining rows, and thus permit the rows of corn to be cultivated by cross-row plowing.

The improvement consists in connecting the wheels and axles of a corn-planter with the seed-dropping device by means of an improved compensating gear which will operate and govern the movement of said seed-dropping device by the wheel which shall have the slowest movement, and disconnect said dropping device from the fast-moving wheel or wheels, which latter cause irregularity of motion by slipping and moving over obstructions and irregularities of the surface of the ground.

The improvement also consists in certain details of construction of the clutch mechanism hereinafter more fully described and particularly pointed out in the claims.

In the accompanying drawings, Figure 1 is a plan of a corn-planter with a part of the gearing in section; Fig. 2, a section through one of the axles, showing fragments of the gear-wheels in elevation; and Fig. 3 is a detail showing a modification of the actuating pawl.

The frame A of a corn-planter is supported upon wheels B B, keyed to independently-revolving axles C C', extending approximately half-way across the frame in the same axial line, and journaled in bearings bolted to the longitudinal beams A' of the frame.

The inner ends of the axles C C' are keyed to spur gear-wheels D D', located upon opposite sides of a center gear-wheel, E, supported to revolve freely upon the end of the axle C'. Both faces of the center gear-wheel, E, have pawls F F', of well-known construction, pivoted positively thereto, and located to each other and to the cogs in the wheels D D' in such relation that one pawl will act upon the adjacent cog slightly in advance of the other pawl upon its adjacent cog.

Actuating pawl G is supported upon opposite faces of the center gear-wheel, E, by a link, G', pivoted at its upper end to the said gear-wheel and pivoted at its lower end to the back end of pawl G, and by a link, G², pivoted at its lower end to the gear-wheel E and at its forward end to the said pawl G. A spring, G³, presses between the back end of the pawl G and the end of a recess, H, in the face of the gear-wheel E, and the forward end of the pawl G is held by the spring G³ to press against the end of a recess, H', in the face of the said gear-wheel E, the link G' serving to hold the jaw g of the pawl G in engagement with the notches in the gear-wheel D when the said pawl is pushed forward by the spring G³.

The gear-wheels D D' and the gear-wheel E are all revolved in the same direction, as indicated by the full-line arrows in Fig. 2, and will revolve together when the axles C C' and wheels D D' revolve at a uniform speed. When, however, one of the axles or wheels secured thereon revolves at a greater rate of speed than the other wheel, the cogs of the fast-moving wheel will press against the forward end of the pawl G and overcoming the pressure of the spring G³ will push the said pawl backwardly and cause it to be lifted by the links G' G² clear of the notch in which it has been held in the wheel D, and thus permit the slowest-moving gear-wheel D' to control the movement of the gear-wheel E. The retardation of the movement of wheel D' will hold the pawl engaged therewith, together with wheel E, backward against the action of the more rapidly-moving wheel D, which will thereby push against the forward end of its pawl and raise it from engagement with the notch in the said wheel D, as before stated.

The pawls F F' are each actuated by springs *f,* pressing against the free end and held within a recess, *e,* in the face of the wheel E. The action of the pawls F F' at short intervals, one succeeding the other, will prevent the wheel E from slipping and prevent the said pawls from failing to act upon said wheel, as one pawl will drop behind its tooth before the other pawl completely leaves its tooth. The wheel E is connected in any well-known or preferred manner to the slide or to the rotary dropper-shaft, and by the above-described compensating clutch the said dropping device is operated by the gear having the slowest movement. When one of the wheels D D' is in a rut or dead furrow, or when it passes over obstructions causing an acceleration of the movement of one of said wheels over the other of said wheels, the rapidly or irregularly moving wheel will be thrown out of gear with the dropping device. When three wheels are employed, the third wheel, $B^2$, is arranged to follow the two leading wheels, and is geared to the central gear-wheel, E, as shown in Fig. 1, and when the forward wheels, B B', are passing over a dead furrow the rear wheel, $B^2$, will be upon even ground and will hold or retard the motion of the gear-wheel E until the said wheels B B' shall have left the dead furrow, when they will resume control of the gear-wheel E and dropping mechanism, while the rear wheel, $B^2$, is passing over the uneven ground.

The actuating-pawl G is preferably formed with two or more teeth, $g\ g'\ g^2$, all of which engage with the teeth of the wheels D and D' and insure a firm and secure connection between them.

The wheel $B^2$ is keyed to a shaft, $C^2$, supported in bearings $C^3$, upon rearward extensions of the longitudinal frame-beams A', to trail upon the ground in rear of the frame. A band-pulley, $B^3$, upon the shaft $C^2$, is connected by a belt, I, with a similar band-pulley, K', upon a shaft, K, supported in bearings $K^2$ upon the rear end of the frame. A gear-wheel, $K^3$, secured to the shaft K, engages with the gear-wheel E, and has a ratchet-tooth, $K^4$, upon the face of its hub. A ratchet-toothed collar, M, is keyed to the shaft K to slide thereon, and held by a bell-crank lever, L, and spring $l$ to engage with the teeth $K^4$ upon the hub of the gear-wheel $K^3$.

The operation of the wheel $B^2$ upon the compensating gear is as follows: When both of the wheels B are moving faster than the wheel $B^2$, because of irregularities of the surface of the ground or from other cause, the belt I will hold the shaft K, gear $K^3$, and gear-wheel E back against the movement of the actuating-pawl G, and the seed-dropping mechanism proper, which is driven by the crank $K^5$ of the shaft K, will be moved by the slowest-moving wheel $B^2$. When the wheel $B^2$ moves faster than the other wheels, the ratchet $K^4$ will disengage with the teeth upon the collar M and cease to move the shaft K and droppers connected therewith, thus allowing the slowest-moving wheel to control the movement of the droppers. The lever L may be moved to throw the collar M out of gear, and thus disconnect the droppers from the gearing when desired.

I claim as my invention and desire to secure by Letters Patent—

1. The combination, in a corn-planter, of the supporting-wheels B B' and following wheel $B^2$, geared together with a compensating gear, and a dropping mechanism geared to and actuated by said compensating gear, substantially as described.

2. The combination, with the independently-rotating axles, of gears D D', secured thereto, an intermediate wheel, E, having a retaining pawl or pawls, F F', and a pawl, G, linked to the face of said wheel and held in engagement with the teeth of its gear-wheel, substantially as described.

3. The combination, with the axles C C', of gear-wheels D D' and intermediate wheel, E, having a pawl, G, suspended upon the face of the wheel E by links G' $G^2$ and actuated by a spring, $G^3$, located at the rear end thereof, substantially as described.

4. The combination, with the axles C C', gear-wheels D D', and an intermediate wheel, E, having recesses H H' in the face thereof, a pawl, G, links G' $G^2$, and a spring, $G^3$, located in the recess H' at the rear end of said pawl, substantially as described.

JOHN SWENOM JOHNSON.

Witnesses:
H. E. CHAMBERLIN,
W. C. PIERCE.